United States Patent
Bevly et al.

(10) Patent No.: US 6,681,180 B2
(45) Date of Patent: Jan. 20, 2004

(54) DETERMINATION AND CONTROL OF VEHICLE SIDESLIP USING GPS

(75) Inventors: David M. Bevly, Auburn, AL (US); Joseph C. Gerdes, Los Altos, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 10/060,875

(22) Filed: Jan. 29, 2002

(65) Prior Publication Data

US 2002/0198655 A1 Dec. 26, 2002

Related U.S. Application Data

(60) Provisional application No. 60/264,967, filed on Jan. 29, 2001.

(51) Int. Cl.⁷ ................................................. G01C 1/00
(52) U.S. Cl. ........................... 701/213; 701/36; 280/5.5
(58) Field of Search ................................. 701/213, 200, 701/1, 36, 37; 340/988; 280/5.5, 5.506, 5.507; 73/178 R

(56) References Cited

U.S. PATENT DOCUMENTS

| | | | |
|---|---|---|---|
| 4,384,293 A | 5/1983 | Deem et al. ................. | 343/113 |
| 4,418,358 A | 11/1983 | Poetsch et al. ............... | 358/80 |
| 4,599,620 A | 7/1986 | Evans ......................... | 343/357 |
| 4,644,358 A | 2/1987 | Sekine ........................ | 342/356 |
| 4,719,469 A | 1/1988 | Beier et al. ................. | 342/434 |
| 4,870,422 A | 9/1989 | Counselman, III .......... | 342/357 |
| 4,963,889 A | 10/1990 | Hatch .......................... | 342/357 |
| 4,994,812 A | 2/1991 | Uematsu et al. ............. | 342/59 |
| 5,101,356 A | 3/1992 | Timothy et al. ............. | 364/449 |
| 5,177,489 A | 1/1993 | Hatch .......................... | 342/357 |

(List continued on next page.)

OTHER PUBLICATIONS

S. Kimbrough, "Coordinated Braking and Steering Control for Emergency Stops and Accelerations", Proceedings of the WAM ASME, Atlanta, GA 1991, pp. 229–244.

(List continued on next page.)

Primary Examiner—William A. Cuchlinski, Jr.
Assistant Examiner—Olga Hernandez
(74) Attorney, Agent, or Firm—Lumen Intellectual Property Services, Inc.

(57) ABSTRACT

A method for determining a sideslip angle of a terrestrial vehicle that moves on wheels by using a global positioning system (GPS) receiver. The GPS receiver is mounted in the vehicle and measures the horizontal velocity of the vehicle as well as its attitude. The sideslip angle of the vehicle at the GPS receiver is obtained from these measurements. The body sideslip angle and tire sideslip angles are derived by translating the sideslip angle at the GPS receiver to the center of gravity and to the wheels. Alternatively, an on-board gyroscope is provided for measuring vehicle attitude while the horizontal velocity is obtained from the GPS receiver. The method is extended to derive wheel slip and tire cornering stiffness. The vehicle states derived by the method can be used in a stability control system for stabilizing the motion of the vehicle.

17 Claims, 2 Drawing Sheets

U.S. PATENT DOCUMENTS

| | | | |
|---|---|---|---|
| 5,185,610 A | 2/1993 | Ward et al. | 342/357 |
| 5,296,861 A | 3/1994 | Knight | 342/357 |
| 5,347,286 A | 9/1994 | Babitch | 342/359 |
| 5,406,489 A | 4/1995 | Timothy et al. | 364/434 |
| 5,557,520 A * | 9/1996 | Suissa et al. | 701/29 |
| 5,572,218 A | 11/1996 | Cohen et al. | 342/357 |
| 5,755,291 A | 5/1998 | Orbach et al. | 172/2 |
| 5,911,769 A | 6/1999 | Orbach et al. | 701/50 |
| 5,983,161 A | 11/1999 | Lemelson et al. | 701/301 |
| 6,052,647 A | 4/2000 | Parkinson et al. | 701/215 |
| 6,152,546 A | 11/2000 | Daigle | 303/151 |
| 6,184,821 B1 * | 2/2001 | Hrovat et al. | 342/357.08 |
| 6,275,773 B1 | 8/2001 | Lemelson et al. | 701/301 |
| 6,445,983 B1 * | 9/2002 | Dickson et al. | 701/23 |
| 6,480,120 B1 * | 11/2002 | Meunier | 340/970 |

OTHER PUBLICATIONS

C.E. Cohen et al., "Flight Tests of Attitude Determination Using GPS Compared Against as Inertial Navigation Unit", Navigation: Journal of the Institute of Navigation, vol. 41, No. 1, Spring 1994.

P.Y. Montgomery et al., "Analysis of Angular Velocity Determination Using GPS", Proceedings of ION GPS 1994, Salt Lake City, UT, 1994.

E. Abbot et al., "Land–Vehicle Navigation Using GPS", Proceedings of the IEEE, Jan. 1999, vol. 87, No. 1, pp. 145–162.

V. Morellas et al., "Preview Based Control of a Tractor Trailer Using DPGS for Road Departure Accidents", Proceedings of the IEEE Conference on Intelligent Transportation Systems, Boston, MA, Nov. 1997.

R.P. Kornfeld et al., "Single Antenna GPS Based Aircraft Attitude Determination", Proceedings of the ION Technical Meeting, Long Beach, CA, Jan. 1998.

D. Gebre–Egziabher et al., "A Low–Cost GPS/Inertial Attitude Heading Reference System (AHRS) for General Aviation Application", Proceedings of the 1998 IEEE Position Location and Navigation Symposium, Apr. 1998, pp. 518–525.

* cited by examiner

DETERMINATION AND CONTROL OF VEHICLE SIDESLIP USING GPS

RELATED APPLICATIONS

This application claims priority from provisional application No. 60/264,967 that was filed on Jan. 29, 2001 and is herein incorporated by reference.

FIELD OF INVENTION

This invention relates to measuring and controlling vehicle sideslip by using the global positioning system (GPS), and more particularly to deriving the sideslip angle of a vehicle and other parameters based on GPS measurements.

BACKGROUND

It is well known that information about certain states of vehicle motion can be used to control the operation of the vehicle. These vehicle states typically include wheel slip, body sideslip angle, and tire sideslip angle. Theoretically, knowledge of the instantaneous values of these three vehicle states could be used by appropriate vehicle stability control systems, e.g., acceleration, steering direction or wheel brakes to correct dangerous states or avoid them. Considerations of stability control systems requiring wheel slip and body sideslip angle are well known and are discussed in many references including, for example, S. Kimbrough, "Coordinated Braking and Steering Control for Emergency Stops and Accelerations", Proceedings of the WAM ASME, Atlanta, Ga. 1991, pp. 229–244. The challenge, however, resides in deploying appropriate sensors for accurately measuring vehicle parameters and deriving from these measurements the vehicle states for stability control purposes.

The prior art teaches the use of dedicated (and frequently costly) on-board sensors for measuring a number of parameters. For example, wheel speed sensors are commonly used to measure wheel speed. Many prior art systems teach to estimate some of the vehicle states, e.g., tire slip, by comparing values from wheel speed sensors to an estimate of the vehicle velocity (which is oftentimes computed from the four wheel speeds). However, under high slip circumstances, where stability control systems are most often required, this estimate of vehicle speed becomes less accurate. In addition, many stability control systems must integrate noisy and biased on-board sensors in order to obtain slip angle estimates for tire and body slip. Other systems utilize non-linear observers to estimate the slip angel from a yaw rate measurement. In all of these cases, the error associated with estimation places severe constraints on the control algorithm employed. Other methods for estimating vehicle sideslip angle include vision or a vehicle speed-measuring unit.

The global positioning system (GPS) promises to deliver some of these critical values and eliminate the reliance of on-board sensors. GPS provides the ability to determine a body's position anywhere on the surface of the globe. Atmospheric conditions, injected noise called Selective Availability (SA), and other random noise corrupts the positioning accuracy. However, differential corrections, known as differential GPS (DGPS), can eliminate most of these errors and the Doppler shift in the carrier-phase ranging signal provides good velocity values without any differential corrections. Additionally, a four antennae carrier-phase GPS unit can be used to provide 0.1° attitude measurements in roll, pitch and yaw and accurate attitude rate of change measurements without a correction reference station, as described by C. E. Cohen et al., "Flight Tests of Attitude Determination Using GPS Compared Against as Inertial Navigation Unit", Navigation: Journal of the Institute of Navigation, Vol. 41, No. 1, Spring 1994 and P. Y. Montgomery et al., "Analysis of Angular Velocity Determination Using GPS", Proceedings of ION GPS 1994, Salt Lake City, Utah, 1994.

The prior art teaches to equip vehicles with GPS receivers to obtain vehicle position measurements. For example, a ground based GPS and one carried by a moving vehicle can be used for measuring its precise position. This approach is described in U.S. Pat. No. 5,572,218 to Cohen et al., who use it to obtain precise locations of airplanes rather than vehicles.

Measurements obtained from GPS receivers have already been used on numerous occasions to determine the velocity of a vehicle and use this measurement in vehicle control systems. For example, in U.S. Pat. No. 6,152,546 Daigle recognizes that provision of a wheel slip and slide correction system in which the monitored or triggered variable is different from the control variable can be used to control trains. Daigle's wheel slip and slide system requires knowledge of train velocity to correct the motion of the train, e.g., the system can implement a torque reduction if the actual wheel velocity varies from the computed velocity. Daigle teaches that the speed of the train can be obtained, among other, from a measurement performed by a GPS sensor.

U.S. Pat. Nos. 5,755,291 and 5,911,769 to Orbach et al. teach a system for regulating wheel slippage of a vehicle carrying or trailing an implement. Their system includes sensors for sensing the vehicle's apparent speed and ground speed and an input device. Orbach et al. indicate that GPS can be used to obtain sequential position signals of the vehicle and determine from them the true ground speed. Specifically, ground speed is equal to the change between sequential positions of the vehicle divided by elapsed time. The system also includes a control circuit configured to generate a slip signal that can be used to control the implement.

The use of GPS for gathering position and motion data for a large number of vehicles and use of such data for traffic monitoring and management have also been considered. For example, GPS has proven effective when implemented on vehicles for land navigation as described by E. Abbot et al., "Land-Vehicle Navigation Using GPS", Proceedings of the IEEE, January 1999, Vol. 87, No. 1, pp. 145–162 as well as for lanekeeping as described by V. Morellas et al., "Preview Based Control of a Tractor Trailer Using DPGS for Road Departure Accidents", Proceedings of the IEEE Conference on Intelligent Transportation Systems, Boston, Mass., November 1997.

Pursuing a similar vein, U.S. Pat. Nos. 5,983,161 and 6,275,773 issued to Lemelson et al. teach a GPS based vehicle collision avoidance and warning system. The system uses GPS satellite ranging signals and pseudolite carrier phase ambiguity resolution signal from a fixed earth based station to continuously determine a kinematic tracking position of vehicles on a pathway with centimeter accuracy. The GPS-based position is communicated with other status information among a plurality of vehicles and control centers. The data are processed and analyzed in neural networks in one vehicle to identify, rank and evaluate collision hazards.

The GPS measurements disclosed by Lemelson et al. include determination of vehicle attitude with the aid of multiple GPS antennae placed on the extremities of the vehicle. A comparison of phase differences in signals received simultaneously from the GPS antennae is used to determine the attitude of the vehicle relative to a reference plane in space or on the ground, or relative to a predetermined direction over the earth's surface. Lemelson et al. use separate fuzzy logic control inference rules to sense unusual vehicle attitude, e.g., with respect to the North, and generate attitude compensated collision warning information. Further information about various differential GPS techniques and studies of GPS antennae are discussed in U.S. Pat. Nos. 4,384,293; 4,418,358; 4,599,620; 4,644,358; 4,719,469; 4,870,422; 4,963,889; 4,994,812; 5,101,356; 5,177,489; 5,185,610; 5,296,861; 5,347,286 and 5,406,489. The prior art also teaches the use of GPS systems to provide aircraft heading information as described by R. P. Kornfeld et al., "Single Antenna GPS Based Aircraft Attitude Determination", Proceedings of the ION Technical Meeting, Long Beach, Calif., January 1998 and D. Gebre-Egziabher et al., "A Low-Cost GPS/Inertial Attitude Heading Reference System (AHRS) for General Aviation Application", Proceedings of the 1998 IEEE Position Location and Navigation Symposium, April 1998, pp. 518–525.

In an attempt to use GPS to derive more accurate measurements and exercise more control over a vehicle U.S. Pat. No. 6,052,647 to Parkinson et al. teaches a method and system for automatic control of vehicles based on carrier phase differential GPS. Parkinson's system employs carrier phase differential GPS to determine both vehicle position and attitude very precisely. The system also compensates for antenna motion due to vehicle roll and pitch caused by ground disturbances. This system is designed for real-time guidance and control of a vehicle. Although this system goes a long way to integrating GPS in real-time vehicle control, it does not consider wheel sideslip or body sideslip angles of the vehicle.

In sum, the above prior art techniques teach how to integrate GPS sensors and measurements obtained from them in vehicle monitoring and control systems to, in some cases, overcome the problems associated with on-board sensors. None of these techniques, however, can be used to yield information about the body sideslip angle and tire sideslip angles of a particular vehicle to enable real-time control.

OBJECTS AND ADVANTAGES

In view of the above, it is an object of the present invention to provide a method for determining sideslip angles of the body and tires of a terrestrial vehicle moving on a set of wheels with the aid of the global positioning system (GPS). It is a further object of the invention to use knowledge of the body and tire sideslip angles derived with the aid of GPS in a stability control system.

It is another object of the invention to provide a method that takes advantage of GPS to provide a simple, accurate and cost-effective measurement of the body and tire sideslip angles.

Yet another object of the invention is to ensure that the method and control system can be used in conjunction with measurements of other vehicle states to provide for accurate vehicle control.

These and other objects and advantages of the invention will become apparent upon reading the specification.

SUMMARY

The objects and advantages of the invention are achieved by a method for determining a sideslip angle of a terrestrial vehicle that moves on wheels. A qualifying terrestrial vehicle is a car on four-wheels, a truck on four or more wheels, or any other vehicle on two or more wheels. The method relies on the use of a global positioning system (GPS) receiver mounted in the vehicle to measure a horizontal velocity of the vehicle. The horizontal velocity can be derived by dividing a distance between two position measurements into the time elapsed between the measurements, or from a Doppler measurement or else by dividing the difference between two carrier phase measurements into the time elapsed between the two measurements. The GPS receiver has two antennas to measure an attitude of the vehicle. The horizontal velocity and attitude are used in deriving the sideslip angle of the vehicle at the global positioning receiver.

Once the value of the sideslip angle at the GPS receiver is known, it can be translated to any other point on the vehicle to determine specific sideslip angles corresponding to vehicle states which can be used in a stability control system. The sideslip angle is translated to a center of gravity of the vehicle to obtain a body sideslip angle $\beta$ of said vehicle. The sideslip angle is translated to one of the wheels to obtain a sideslip angle of the wheel, and in case the wheel bears a tire, this is a tire sideslip angle $\alpha$. Additionally a cornering stiffness of the wheel is derived from its tire sideslip angle $\alpha$.

In most cases where the GPS receiver is mounted at a mounting location away from the center of gravity of the vehicle translation of the sideslip angle to another point of the vehicle involves accounting for vehicle angular velocity at that point in comparison to the vehicle angular velocity at the global positioning receiver. It is also important that the horizontal velocity be corrected by a correction factor related to the mounting location of the GPS receiver.

Depending on the application, additional vehicle states are determined as needed. For example, when the method of the invention is used for vehicle control purposes, it is convenient to obtain a wheel slip. The wheel slip is obtained by measuring a wheel speed of at least one wheel on which the vehicle moves and taking a difference between an x-component of horizontal velocity, which is the velocity component along the frame of the vehicle, and the wheel speed.

In accordance with an alternative embodiment of the method, the GPS receiver is used for measuring the horizontal velocity and a gyroscope is provided in the vehicle for measuring its attitude. The attitude can be obtained, for example, by integrating the gyroscope signal. The sideslip angle at the global positioning receiver is then derived from the horizontal velocity and the attitude as before. The measurement of the horizontal velocity, since it is derived from the GPS receiver, requires some time, i.e., the measurement has a latency or time offset with respect to the gyroscope measurement. In order to improve the performance of the method, the time offset is determined and the measurement of the horizontal velocity is corrected for the time offset.

The invention further includes a stability control system for stabilizing the motion of a terrestrial vehicle. In one embodiment the control system has a GPS receiver for measuring the horizontal velocity and attitude of the vehicle. In another embodiment, the control system has a GPS receiver for measuring the horizontal velocity and a gyroscope for measuring the attitude. The control system also has a processing unit for deriving the sideslip angle at the global positioning receiver from the horizontal velocity and attitude. The control system also has a control mechanism for using the sideslip angle to stabilize the vehicle. It is understood, that the control mechanism can first translate the sideslip angle to obtain the body or tire sideslip angles $\beta$ or $\alpha$. In a preferred embodiment of the stability control system, the control mechanism has a Kalman filter configured to use the vehicle state information to stabilize the vehicle.

Further specifics of the invention are described in the below detailed description and illustrated in the appended drawing figures.

DETAILED DESCRIPTION

Figure 1:
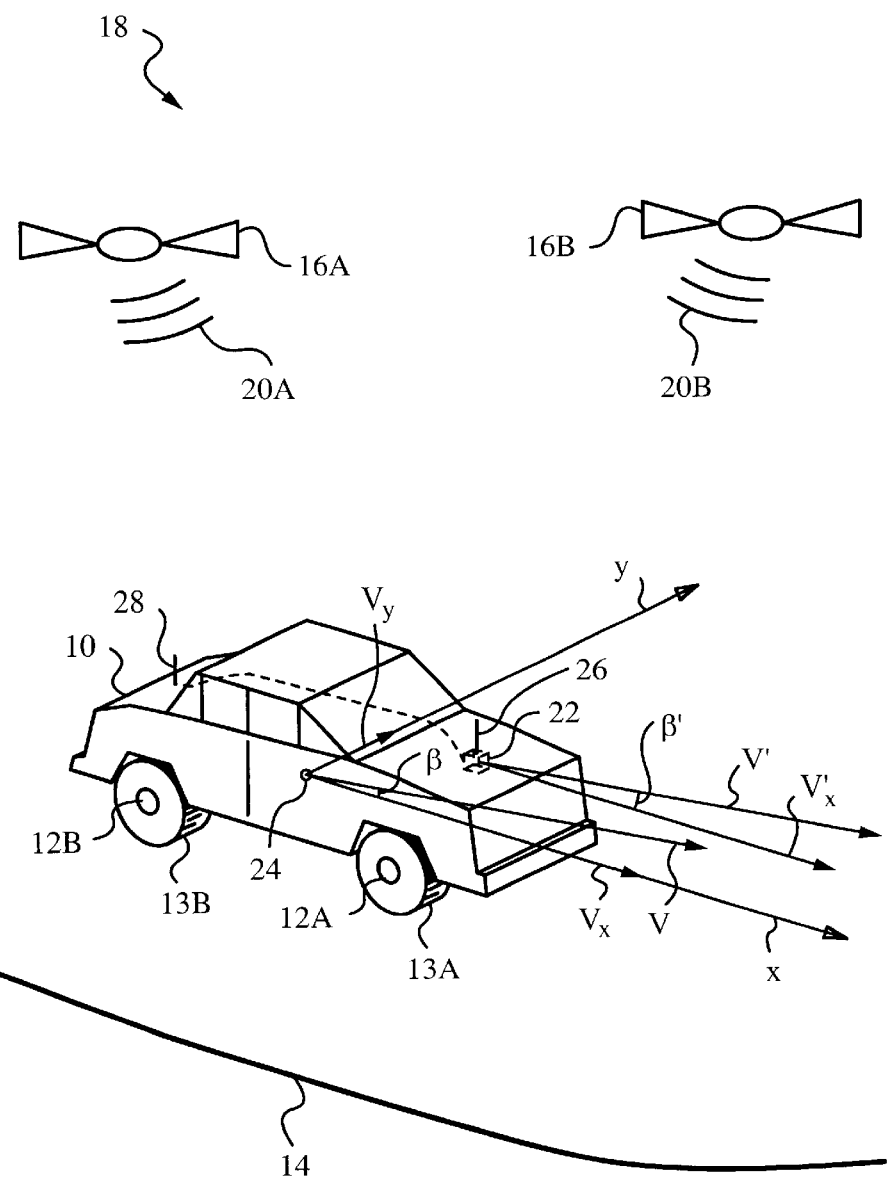
FIG. 1 shows a terrestrial vehicle equipped with a GPS receiver for practicing the method of the invention.

The method and stability control system of the invention will be best understood by initially referring to FIG. 1, which illustrates a terrestrial vehicle 10 moving on a set of wheels 12. Specifically, vehicle 10 is a passenger car moving on four wheels with tires, of which two wheels 12A, 12B with tires 13A, 13B on the left side of car 10 are visible. It will be clear to a person skilled in the art, that vehicle 10 can be any terrestrial vehicle which moves on two or more wheels on the earth's surface.

Vehicle 10 is shown driving on a road 14 in view of two global positioning satellites 16A, 16B belonging to a global positioning system (GPS) 18. It is understood that GPS 18 includes additional satellites (not shown) and can also include ground stations (not shown). Satellites 16A, 16B emit carrier waves 20A, 20B respectively in the direction of vehicle 10. Carrier waves 20A, 20B have frequencies as prescribed by design of GPS 18. For example carrier wave 20A has a frequency of 1575.42 MHz and carrier wave 20B has a frequency of 1227.60 MHz. It is important that GPS 18 provide for a three-dimensional velocity determination with high accuracy, e.g., 5 cm/s standard deviation or better. It is understood that any GPS techniques, including the use of correction reference GPS stations (not shown) and differential corrections to cancel selective availability can be used to obtain the desired accuracy.

Vehicle 10 has a GPS receiver 22 mounted on board. GPS receiver 22 has an antenna 26 designed to receive carrier waves 20A and/or 20B and from them to measure a horizontal velocity V' of vehicle 10. Horizontal velocity V' can be derived either by dividing a distance between two position measurements into the time elapsed between the measurements or from a Doppler measurement. It is also possible to derive horizontal velocity V' by dividing the difference between two carrier phase measurements into the time elapsed between the two measurements. All of these techniques are known in the art and can be used in the present method.

GPS receiver 22 along with its antenna 26 is located at a certain distance from a center of gravity 24 of vehicle 10. Hence, the vector obtained by GPS receiver 22 for horizontal velocity V' actually corresponds to the horizontal velocity of vehicle 10 at GPS receiver 22 and more precisely, at antenna 26.

GPS receiver 22 is also designed to measure a heading direction or attitude of vehicle 10. The attitude is defined to extend along body x-axis or along frame 30 of vehicle 10. In other words, attitude is the direction in which vehicle 10 and more specifically its frame 30 is pointed (see FIG. 2). In the present embodiment, the x-component of horizontal velocity $V_x'$ is also shown extending along the x-axis.

To perform the attitude measurement GPS receiver 22 is connected to a second antenna 28 at a different location on vehicle 10. The attitude or x-axis of vehicle 10 is further referenced to a fixed plane or line R by an angle $\Psi$ (see FIG. 2). A person skilled in the art will recognize that more than two antennas 22, 28 can be used in making this measurement, as necessary.

An angle $\beta'$ between horizontal velocity V' and vehicle heading is a sideslip angle of vehicle 10 at GPS receiver 22. Sideslip angle $\beta'$ at GPS receiver 22 is derived from the measurements of horizontal velocity V' and attitude. Once the value of sideslip angle $\beta'$ is known, it can be translated to any other point on vehicle 10 in accordance with well-known mathematical and physical principles. In performing this translation it is necessary to know the angular velocity $\omega$ of vehicle 10. Specifically, the horizontal velocity $V_P$ of vehicle 10 at any given point P is described by:

$$V_P = V_A + \vec{\omega} \times \vec{r}_{A/P},$$

where $V_A$ is horizontal velocity at antenna 26 (in this case $V_A = V'$ as antenna 26 is mounted in the same location as GPS receiver 22) and $r_{A/P}$ is the vector between antenna 26 and the selected point P. The standard contributors to this angular velocity $\omega$ are roll, pitch and yaw rates of vehicle 10. These quantities can be measured in accordance with well-known principles, e.g., by using gyroscopes. In many cases, roll and pitch rates can be assumed negligible. The present embodiment provides a gyroscope 34 (see FIG. 2) which can be used for measuring the yaw rate.

Figure 2:
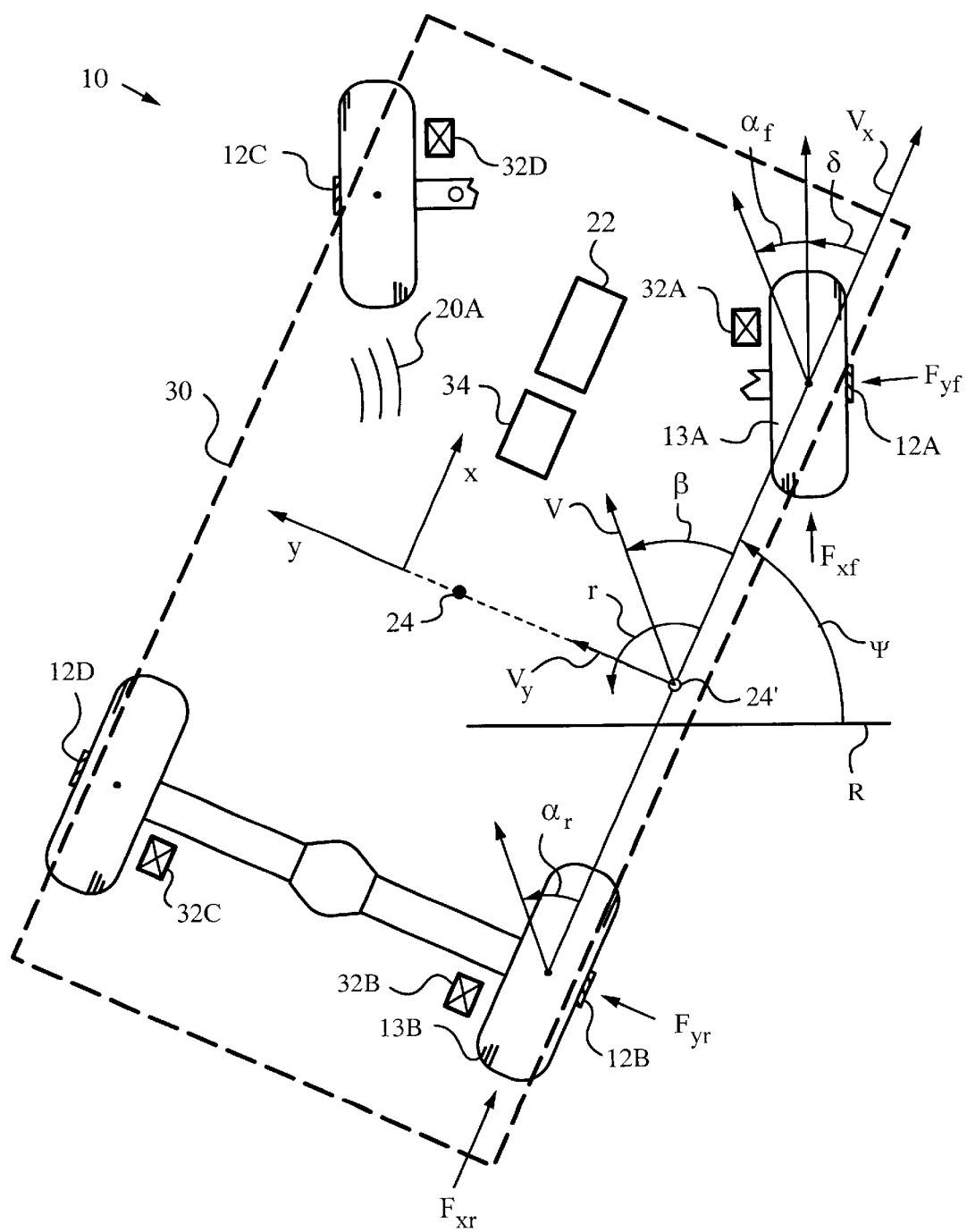
FIG. 2 is a plan diagram illustrating the vehicle of FIG. 1.

The translation of sideslip angle $\beta'$ to specific points on vehicle 10 is better visualized in FIG. 2. In this figure vehicle 10 is analyzed in accordance with the bicycle model, in which only a half of vehicle 10 is considered; in this case the left half with wheels 12A and 12B. In the bicycle model it is assumed that the same conditions apply to both sides of vehicle 10 making it unnecessary to perform the analysis for the right side of vehicle 10 with wheels 12C, 12D. Of course, as will be appreciated by a person skilled in the art, a full model of both sides of vehicle 10 can also be used.

First, sideslip angle $\beta'$ it translated to center of gravity 24 to obtain a body sideslip angle $\beta$. In the bicycle model, center of gravity 24 is equivalent to point 24' between wheels 12A, 12B, hence body sideslip angle $\beta$ is indicated at point 24'. The translation is performed in accordance with the equation:

$$\beta_P = \tan^{-1}\left(\frac{V_y^P}{V_x^P}\right),$$

where (P) is the point to which sideslip angle $\beta$ is translated and $V_x$, $V_y$ are the components of horizontal velocity V along the x and y-axes in body fixed coordinates as indicated.

Second, sideslip angle $\beta'$ is translated to front wheel 12A to obtain a tire sideslip angle $\alpha$ for tire 13A. The translation is performed in accordance with the same equation. However, since front wheel 12A is turned at a steer angle $\delta$ to direction x, tire sideslip angle $\alpha_f$ of front tire 13A is given by:

$$\alpha_f = \beta_f - \delta.$$

Steer angle δ is obtained from a steer angle measurement. In the present embodiment back wheel 12B is not steered. Therefore, tire sideslip angle $\alpha_r$ of rear tire 13B is simply:

$$\alpha_r = \beta_r.$$

In a preferred embodiment, vehicle 10 is equipped with wheel speed sensors 32A through 32D for measuring the wheel speeds of wheels 12A through 12D. Wheel speed sensors and their principles of operation are well known in the art. In the present invention sensors 32A through 32D are used to determine wheel slip of corresponding wheels 12A through 12D. This is done by measuring the wheel speed and taking the difference between the velocity $V_x$ along the x-axis or frame 30 and the wheel speed. Wheel slip will occur during times of heavy braking and acceleration. It is convenient to calibrate wheel speed sensors 32A through 32D from measurements of velocity $V_x$ performed by GPS receiver 22 during times of normal operation of vehicle 10.

Referring still to FIG. 2, an alternative embodiment of the method of invention takes advantage of gyroscope 34 provided in vehicle 10 to determine attitude. Thus, gyroscope 34 is any suitable gyroscope capable of measuring the attitude of vehicle 10. For example, a standard yaw gyro, such as a KVH Fiber Optic Gyro, can be used as gyroscope 34 and the attitude can be obtained by integrating its signal. To perform the measurement gyroscope 34 is initialized and its bias estimated during periods of straight driving. Then, the signal from gyroscope 34 is integrated during turning maneuvers to provide vehicle heading or attitude. In this alternative method the attitude measured by gyroscope 34, rather than by GPS receiver 22, is used in conjunction with horizontal velocity V in deriving sideslip angle β' at GPS receiver 22. In this case GPS receiver 22 only needs one antenna.

A major source of error in using GPS measurements for slip angle estimation in this embodiment arises from latency of the GPS measurements. Typically, GPS receiver 22 has a low sample rate of about 10 Hz. This introduces a one-half sample period (50 ms) inherent latency. A larger latency component is due to the finite processing and transmission time of data from GPS receiver 22. When side slip angle β' is being measured as the difference between horizontal velocity V obtained from GPS receiver 22 and attitude obtained from gyroscope 34, a time offset between the two values results in a sideslip error equal to the time offset multiplied by the rate of turn. As an example, a 50 ms time offset for a 30°/s turn introduces a 1.5° error. Since expected sideslip angles are on the order of 3–7°, this represents a large error source and shows the importance of accounting for the GPS latency in order to ensure accurate vehicle state estimates. The time offset can be corrected by using time tags in GPS velocity messages to synchronize the data from GPS receiver 22 with the recording system time. Typical values for the time offset including the inherent latency can be equal to 140–145 ms.

It is also noted that horizontal velocity measurements relying on two measurements of position or two carrier phase measurements exhibit a time offset to the attitude measurement performed with the aid of antennas 26, 28 of GPS receiver 22. Hence, a time offset should also be determined and applied to correct for latency in these cases.

From the above-described measurements one obtains body sideslip angle β, and tire sideslip angles $\alpha_f$, $\alpha_r$ in a simple, accurate and cost-effective manner. These vehicle states, in conjunction with wheel slip, can be used in any suitable stability control system to stabilize vehicle 10. Preferably, a stability control system of such type uses a Kalman filter, ABS brakes and accelerator control. The application of these vehicle states to control the selective use of ABS brakes on wheels 12A through 12D and selective acceleration on wheels 12A through 12D to prevent sideslip will be apparent to a person skilled in the art.

In addition, tire sideslip angles $\alpha_f$, $\alpha_r$, the lateral accelerations from an accelerometer and yaw rate measurements (minus the sensor biases from the Kalman filter estimation algorithm) can be used to provide an estimate of the front and rear tire cornering stiffness. Estimates of the tire cornering stiffness can be obtained various ways, including analyzing the forces of the bicycle model (shown in FIG. 2) using Newton's equations.

$$\Sigma F_y = m\ddot{y} = F_{yf}\cos(\delta) + F_{yr}$$
$$\Sigma M_z = I_z\ddot{\psi} = aF_{yf}\cos(\delta) - bF_{yr} \qquad (21)$$

The two above equations can be solved simultaneously for the lateral front and rear tire forces. The lateral tire forces are then simply a function of the cornering stiffness as shown below:

$$F_{yf} = 2C_{\alpha f}\alpha_f$$
$$F_{yr} = 2C_{\alpha r}\alpha_r \qquad (22)$$

The factor of 2 in the above equation is due to the fact the bicycle model lumps the left and right tires together. Alternatively, the two equations in the bicycle model can be used to solve for the estimates of the front and rear cornering stiffnesses.

We claim:

1. A method for determining a sideslip angle in a terrestrial vehicle moving on wheels by using a global positioning receiver having at least two antennas mounted in said terrestrial vehicle, said method comprising:
    a) measuring a horizontal velocity of said terrestrial vehicle using said global positioning receiver;
    b) measuring an attitude of said terrestrial vehicle using said global positioning receiver; and
    c) deriving said sideslip angle at said global positioning receiver from said horizontal velocity and said attitude; and
    d) translating said sideslip angle from said global positioning receiver to at least one of said wheels comprising a tire to obtain a tire sideslip angle α.

2. The method of claim 1, further comprising translating said sideslip angle from said global positioning receiver to a center of gravity of said terrestrial vehicle to obtain a body sideslip angle β of said terrestrial vehicle.

3. The method of claim 1, further comprising deriving a cornering stiffness of said at least one wheel from said tire sideslip angle α.

4. The method of claim 1, wherein said horizontal velocity is derived by dividing a distance between two position measurements of said vehicle into the time elapsed between said two position measurements.

5. The method of claim 1, wherein said horizontal velocity is derived from a Doppler measurement using said global position receiver.

6. The method of claim 1, wherein said horizontal velocity is derived by dividing the difference between two carrier phase measurements into the time elapsed between said two measurements.

7. The method of claim 1, further comprising:
    a) measuring a wheel speed of at least one of said wheels;
    b) taking a difference between an x-component of said horizontal velocity and said wheel speed; and c) determining a wheel slip from said difference.

8. A method for determining a sideslip angle in a terrestrial vehicle moving on wheels by using a global positioning receiver mounted in said terrestrial vehicle, said method comprising:

a) measuring a horizontal velocity of said terrestrial vehicle using said global positioning receiver;
   b) providing a gyroscope in said terrestrial vehicle;
   c) measuring an attitude of said terrestrial vehicle using said gyroscope; and
   d) deriving said sideslip angle of said terrestrial vehicle at said global positioning receiver from said horizontal velocity and said attitude; and
   e) translating said sideslip angle from said global positioning receiver to at least one of said wheels comprising a tire to obtain a tire sideslip angle $\alpha$.

9. The method of claim 8, further comprising translating said sideslip angle from said global positioning receiver to a center of gravity of said terrestrial vehicle to obtain a body sideslip angle $\beta$ of said terrestrial vehicle.

10. The method of claim 8, further comprising deriving a cornering stiffness of said at least one wheel from said tire sideslip angle $\alpha$.

11. The method of claim 8, wherein said horizontal velocity is derived by dividing a distance between two position measurements of said vehicle into the time elapsed between said two position measurements.

12. The method of claim 8, wherein said horizontal velocity is derived from a Doppler measurement using said global positioning receiver.

13. The method of claim 8, wherein said horizontal velocity is derived by dividing the difference between two carrier phase measurements into the time elapsed between said two measurements.

14. The method of claim 8, further comprising:

a) measuring a wheel speed of at least one of said wheels;
   b) taking a difference between an x-component of said horizontal velocity and said wheel speed; and
   c) determining a wheel slip from said difference.

15. The method of claim 8, further comprising:

a) determining a time offset for said measurement of said horizontal velocity with respect to said measurement of said attitude; and
   b) correcting said measurement of said horizontal velocity for said time offset.

16. A stability control system for stabilizing the motion of a terrestrial vehicle moving on a set of wheels, said stability control system comprising:

a) a global positioning receiver connected to a plurality of antennas mounted in said terrestrial vehicle; wherein the receiver uses UPS signals received by the plurality of antennas to measure a horizontal velocity of said terrestrial vehicle and an attitude of said terrestrial vehicle;
   b) a processing unit for deriving a tire sideslip angle of one of said wheels of said terrestrial vehicle from said horizontal velocity and said attitude; and
   c) a control mechanism for using said tire sideslip angle to stabilize said terrestrial vehicle.

17. The stability control system of claim 16, wherein said control mechanism comprises a Kalman filter.

* * * * *